United States Patent
Kashibuchi

(10) Patent No.: US 8,749,851 B2
(45) Date of Patent: Jun. 10, 2014

(54) IMAGE PROCESSING APPARATUS AND IMAGE PROCESSING METHOD

(75) Inventor: Yoichi Kashibuchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 234 days.

(21) Appl. No.: 13/290,722

(22) Filed: Nov. 7, 2011

(65) Prior Publication Data

US 2012/0147430 A1 Jun. 14, 2012

(30) Foreign Application Priority Data

Dec. 10, 2010 (JP) ................................. 2010-276390

(51) Int. Cl.
*G06K 15/00* (2006.01)
*H04N 1/407* (2006.01)

(52) U.S. Cl.
USPC ......... 358/3.27; 358/1.9; 358/3.06; 358/3.13; 358/536; 358/534; 382/166; 382/240

(58) Field of Classification Search
USPC ........................... 358/3.27, 1.9; 382/166, 240
See application file for complete search history.

(56) References Cited

U.S. PATENT DOCUMENTS

| | | | |
|---|---|---|---|
| 2003/0044064 A1* | 3/2003 | Obrador | 382/166 |
| 2004/0085592 A1* | 5/2004 | Feng et al. | 358/3.27 |
| 2005/0265624 A1 | 12/2005 | Washio | |
| 2008/0068660 A1 | 3/2008 | Loce et al. | |
| 2010/0171999 A1 | 7/2010 | Namikata et al. | |

FOREIGN PATENT DOCUMENTS

| | | |
|---|---|---|
| EP | 0946049 A1 | 9/1999 |
| JP | 03-076377 A | 4/1991 |
| JP | 2008-199080 A | 8/2008 |
| JP | 2009-134583 A | 6/2009 |
| JP | 2009-246667 A | 10/2009 |
| WO | 97/18666 A | 5/1997 |

OTHER PUBLICATIONS

U.S. Appl. No. 13/291,813, filed Nov. 8, 2011, Applicant: Yoichi Kashibuchi.
Wong, et al., "Adaptive Switching of Dispersed and Clustered Halftone Patterns for Bi-Level Image Rendition", SID International Symposium, vol. SYMP 8, Apr. 19, 1977, pp. 124-125.
European Search Report dated Mar. 26, 2012 issued in European Application No. 11008736.8.
Japanese Office Action dated Apr. 13, 2012, concerning Japanese Patent Application No. 2010-276390.

* cited by examiner

*Primary Examiner* — Quang N Vo
(74) *Attorney, Agent, or Firm* — Fitzpatrick, Cella, Harper & Scinto

(57) ABSTRACT

An image processing apparatus comprises a first screen processing unit which applies screen processing to image data using a first threshold matrix; a second screen processing unit which applies screen processing to the image data using a second threshold matrix different from the first threshold matrix; an edge detection unit which detects an edge portion of an object included in the image data; and an output unit which selects and outputs image data obtained by a logical OR operation between image data obtained by the first screen processing unit and image data obtained by the second screen processing unit for a pixel detected by the edge detection unit as an edge portion, and selects and outputs the image data obtained by the first screen processing unit for a pixel other than the edge portion.

11 Claims, 12 Drawing Sheets

FIG. 7
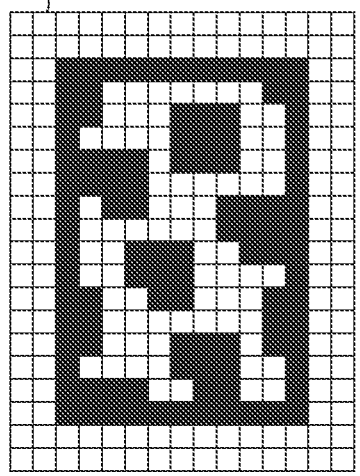
700a
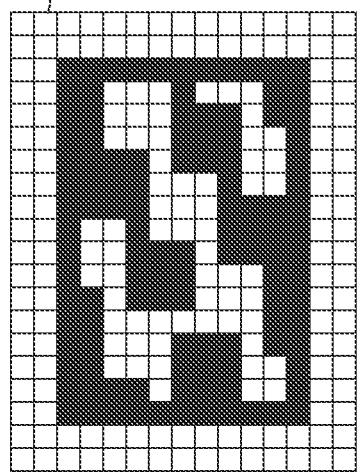
700b

IMAGE PROCESSING APPARATUS AND IMAGE PROCESSING METHOD

BACKGROUND OF THE INVENTION

1. Field of the Invention

The present invention relates to an image processing apparatus and an image processing method which reduce the jaggy in the edge portion of an image to which halftone processing has been applied.

2. Description of the Related Art

An image forming apparatus may produce an uneven outline (jaggy) in the edge portion of a character or the like upon image processing performed during image formation. The jaggy readily occurs especially when applying halftone processing such as screen processing.

There are proposed several techniques for reducing the jaggy caused by halftone processing such as screen processing. For example, Japanese Patent Laid-Open No. 2008-199080 proposes a technique for emphasizing the outline of an object at an edge portion using image data after screen processing and that before screen processing. In this technique, it is determined whether a pixel is an edge portion of an object. If the pixel is an edge portion, it is further determined whether to output a dot in image data after screen processing. If no dot is to be output, a value derived from image data before screen processing is output. If a dot is to be output in image data after screen processing, the image data after screen processing is output.

The above-described method is effective for a multilevel printer capable of expressing a plurality of tones per pixel. However, a binary printer capable of expressing only two tones per pixel may cause an image defect. For example, in edge portion outline emphasis for an object in an intermediate color, if no dot is output in the image data after screen processing, a binary value is obtained from data before screen processing, and therefore, the maximum value is always output. For this reason, when emphasizing the outline of the edge portion, the object has a solid uniform outline with the maximum density independently of its color density, resulting in a processing result unintended by the user.

In addition, in the processing of reducing the jaggy caused by screen processing, the processing of determining whether to output a dot is complex. Hence, it may be impossible to obtain a sufficient processing speed in a low-performance environment.

SUMMARY OF THE INVENTION

The present invention provides a technique of reducing the jaggy in an edge portion caused by screen processing of halftone image data.

According to one aspect of the present invention, an image processing apparatus comprises: a first screen processing unit which applies screen processing to image data using a first threshold matrix; a second screen processing unit which applies screen processing to the image data using a second threshold matrix different from the first threshold matrix; an edge detection unit which detects an edge portion of an object included in the image data; and an output unit which selects and outputs image data obtained by a logical OR operation between image data obtained by the first screen processing unit and image data obtained by the second screen processing unit for a pixel detected by the edge detection unit as an edge portion, and selects and outputs the image data obtained by the first screen processing unit for a pixel other than the edge portion.

According to another aspect of the present invention, an image processing method comprises: a first screen processing step of applying screen processing to image data using a first threshold matrix; a second screen processing step of applying screen processing to the image data using a second threshold matrix different from the first threshold matrix; an edge detection step of detecting an edge portion of an object included in the image data; and an output step of selecting and outputting image data obtained by a logical OR operation between image data obtained in the first screen processing step and image data obtained in the second screen processing step for a pixel detected in the edge detection step as an edge portion, and selecting and outputting the image data obtained in the first screen processing step for a pixel other than the edge portion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing an example of a processing result according to a related art;

DESCRIPTION OF THE EMBODIMENTS

Preferred embodiments of the present invention will now be described in detail with reference to the accompanying drawings. Note that the following embodiments are merely examples, and the scope of the present invention is not limited by the embodiments.

(First Embodiment)

An electrophotographic image forming apparatus will be exemplified below as an image processing apparatus according to the first embodiment of the present invention. In the first embodiment, processing of generating a binary (1-bit tone) image (screen-processed image data) by screen processing will particularly be explained.

<Apparatus Arrangement>

Figure 1:
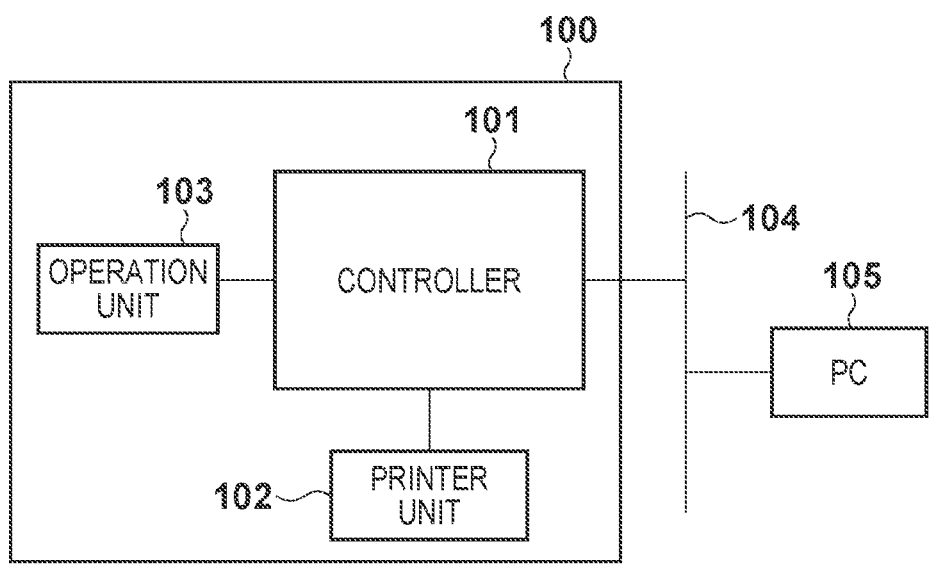
FIG. 1 is a block diagram showing the schematic arrangement of an image forming apparatus.

FIG. 1 is a block diagram showing the schematic arrangement of an image forming apparatus 100. The image forming apparatus 100 includes a controller 101 that performs various kinds of control and image processing, and an operation unit 103 that performs various kinds of setup. The image forming apparatus 100 also includes a printer unit 102 that forms a visualized image on a printing paper sheet. A personal computer (PC) 105 that instructs the image forming apparatus 100 to execute printing, and the like are connected to the image forming apparatus 100 via a network 104. Upon receiving a print execution instruction from the PC 105, the controller 101 rasterizes print data to be sent into image data, performs image processing to be described later, and sends the image data to the printer unit 102.

Figure 2:
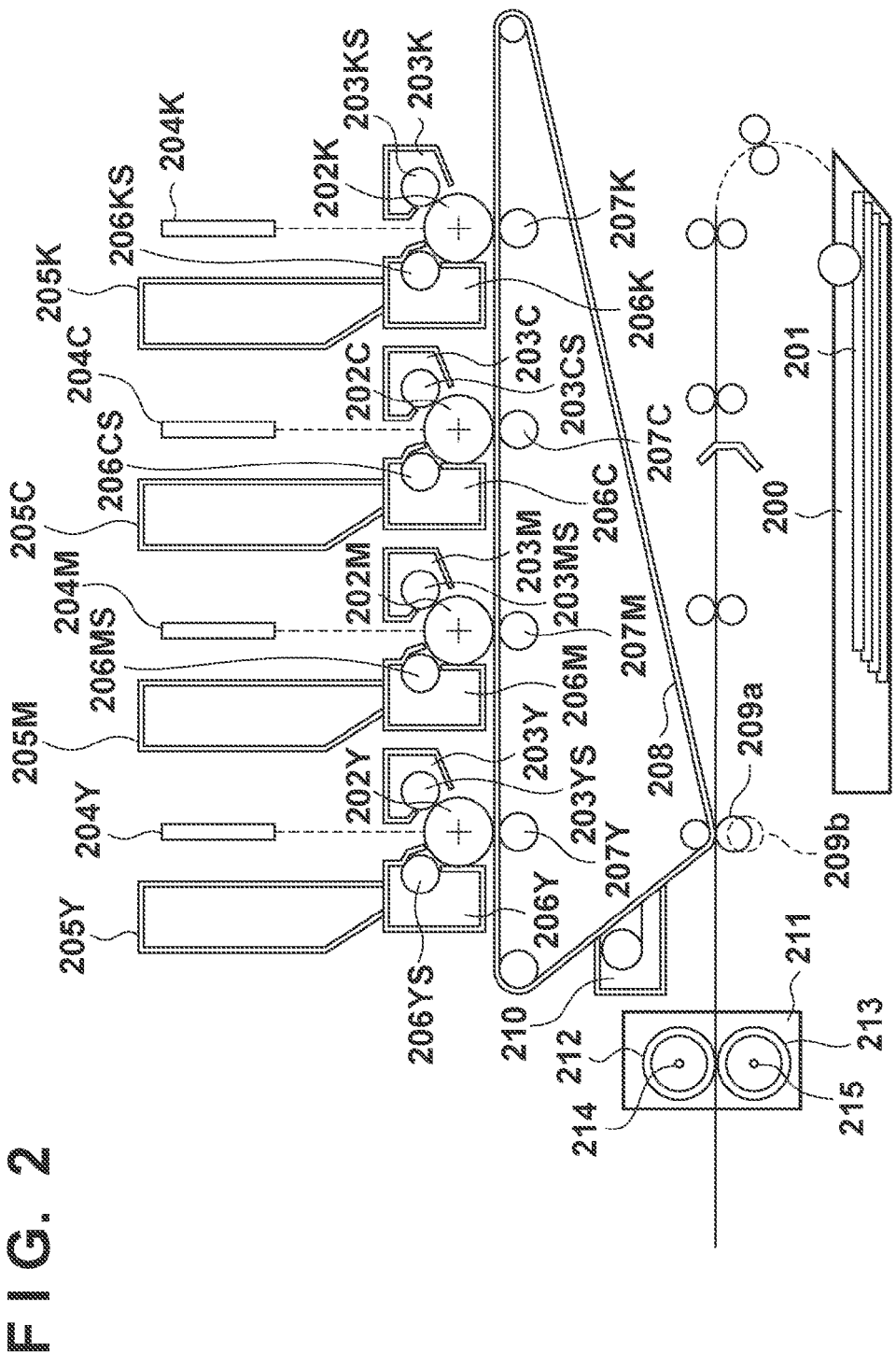
FIG. 2 is a sectional view of the image forming apparatus.

FIG. 2 is a sectional view of the tandem image forming apparatus 100 that adopts an intermediate transfer material 208. The operation of the printer unit 102 in the electrophotographic image forming apparatus 100 will be described with reference to FIG. 2. The printer unit 102 drives exposure light during an exposure time corresponding to image data output from the controller 101 to form an electrostatic latent image, and develops it to form single-color toner images. The single-color toner images are overlaid to form a multicolor toner image. The multicolor toner image is transferred to a recording medium 201 and then fixed to the recording medium. A charging unit includes four injection chargers 203Y, 203M, 203C, and 203K configured to charge photosensitive members 202Y, 202M, 202C, and 202K in yellow (Y), magenta (M), cyan (C), and black (K) stations, respectively. The injection chargers are provided with sleeves 203YS, 203MS, 203CS, and 203KS, respectively.

Each of the photosensitive members 202Y, 202M, 202C, and 202K is formed by applying an organic photoconductive layer to the outer surface of an aluminum cylinder so as to be rotatable upon receiving a driving force from a driving motor (not shown). The driving motor can rotate the photosensitive members 202Y, 202M, 202C, and 202K counterclockwise in accordance with the image forming operation.

An exposure unit is configured to cause scanner units 204Y, 204M, 204C, and 204K to irradiate the photosensitive members 202Y, 202M, 202C, and 202K with exposure light, respectively, and selectively expose the surface of each photosensitive member to form an electrostatic latent image. A developing unit includes four developers 206Y, 206M, 206C, and 206K for developing yellow (Y), magenta (M), cyan (C), and black (K) in the stations, respectively, to visualize the electrostatic latent images. The developers are provided with sleeves 206YS, 206MS, 206CS, and 206KS, respectively. Note that the developers 206Y, 206M, 206C, and 206K are detachable.

A transfer unit rotates the intermediate transfer material 208 clockwise to transfer the single-color toner images from the photosensitive members 202 to the intermediate transfer material 208. The single-color toner images are transferred as the photosensitive members 202Y, 202M, 202C, and 202K and primary transfer rollers 207Y, 207M, 207C, and 207K located on the opposite side rotate. An appropriate bias voltage is applied to the primary transfer rollers 207, and the photosensitive members 202 are rotated at a rotational speed different from that of the intermediate transfer material 208, thereby efficiently transferring the single-color toner images onto the intermediate transfer material 208 (this process is called primary transfer).

The transfer unit also overlays the single-color toner images onto the intermediate transfer material 208 in the stations, and conveys the overlaid multicolor toner image to a secondary transfer roller 209 in accordance with rotation of the intermediate transfer material 208. The transfer unit picks up and conveys the recording medium 201 from a paper feed tray 200 to the secondary transfer roller 209, and transfers the multicolor toner image from the intermediate transfer material 208 to the recording medium 201. An appropriate bias voltage is applied to the secondary transfer roller 209 to electrostatically transfer the toner image (this process is called secondary transfer). The secondary transfer roller 209 is located at a position 209a so as to abut against the recording medium 201 during transfer of the multicolor toner image, and then retreats to a position 209b after the processing.

To fuse and fix the multicolor toner image transferred to the recording medium 201 to the recording medium 201, a fixing unit includes a fixing roller 212 that heats the recording medium 201, and a pressurizing roller 213 that presses the recording medium 201 against the fixing roller 212. The fixing roller 212 and the pressurizing roller 213 are hollow and incorporate heaters 214 and 215, respectively. A fixing device 211 causes the fixing roller 212 and the pressurizing roller 213 to convey the recording medium 201 holding the multicolor toner image and apply heat and pressure to fix the toner onto the recording medium 201.

After fixing the toner, the recording medium 201 is discharged onto a discharge tray by a discharge roller (not shown), thus ending the image forming operation. A cleaning unit 210 cleans the intermediate transfer material 208 by removing the residual toners. The waste toners that remain after the multicolor toner image of four colors formed on the intermediate transfer material 208 has been transferred to the recording medium 201 are stored in a cleaner container.

<Operation of Image Processing Unit>

Figure 3:
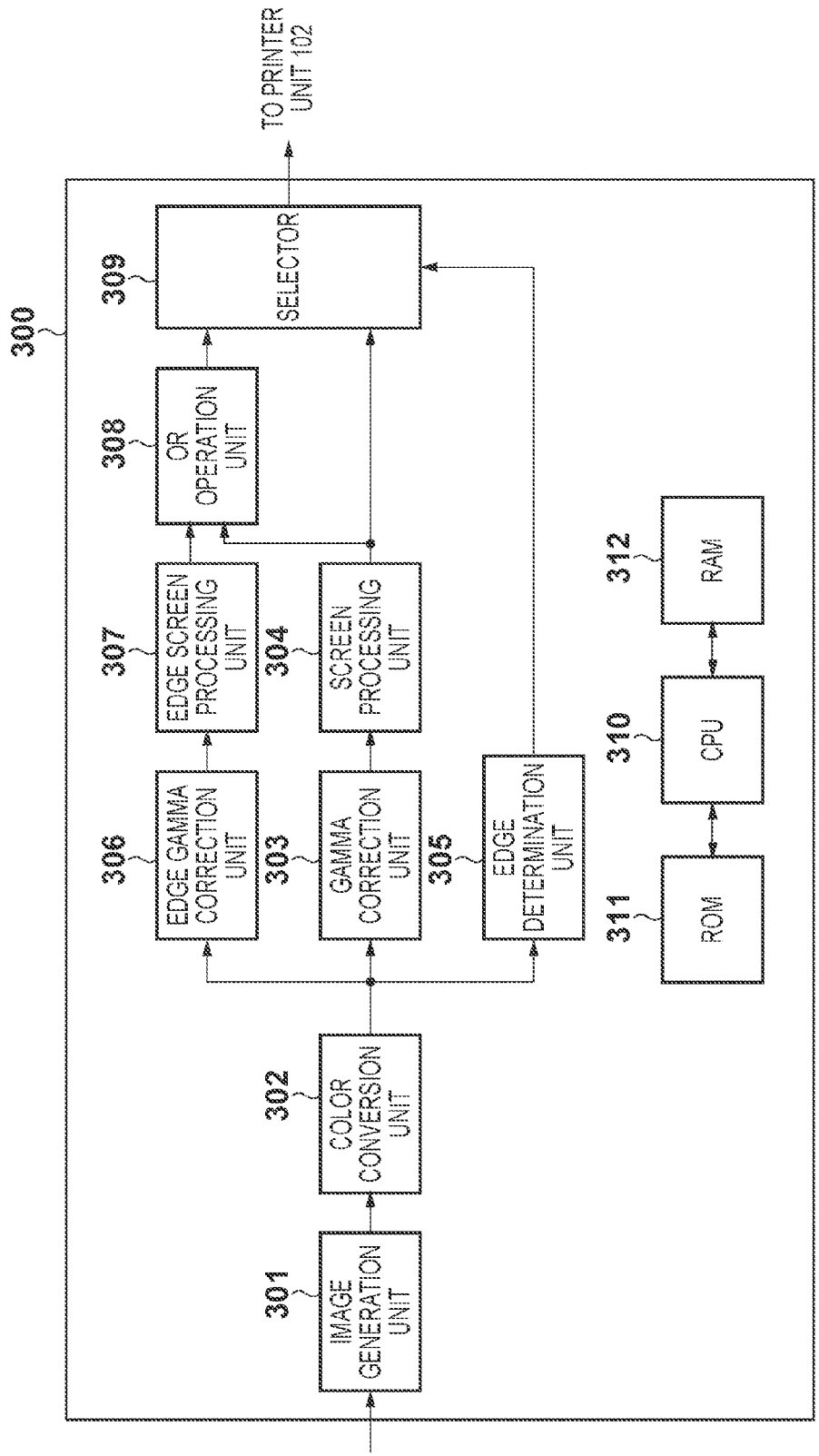
FIG. 3 is a functional block diagram showing an image processing unit according to the first embodiment.

FIG. 3 is a functional block diagram of an image processing unit 300 in the controller 101. An image generation unit 301 generates printable bitmap image data from print data sent from the above-described PC 105. The print data is generally described in a printer description language called PDL (Page Description Language) to be used to create page image data, and normally includes rasterization instructions of data such as characters, graphics, images, and the like. Such print data is analyzed and rasterized to generate bitmap image data.

If the image data generated by image generation unit 301 is image data in the RGB color space, and image data corresponding to four, CMYK color materials is to be input to the printer unit 102, a color conversion unit 302 executes color conversion processing to convert the RGB color space into the CMYK color space. For example, the color conversion unit 302 executes conversion processing of converting the image data from the RGB color space to the CMYK color space using direct mapping by looking up a lookup table. After converting the image data to the CMYK color space, the color conversion unit 302 outputs the image data to a gamma correction unit 303, an edge determination unit 305, and an edge gamma correction unit 306.

The gamma correction unit 303 corrects the received image data using a one-dimensional lookup table such that the image data having undergone screen processing of a screen processing unit 304 to be described later obtains a desired density characteristic when transferred to a printing paper sheet. Since the density characteristic changes depending on the ruling, angle, shape, and the like of the screen of the screen processing unit 304 to be described later, the lookup table to be used for correction needs to be held in association with the screen. Next, the screen processing unit 304 performs screen processing to convert the image data into binary (1-bit) image data printable by the printer unit 102, and outputs the converted image data to an OR operation unit 308 and a selector 309.

The edge gamma correction unit 306 corrects the received image data using a one-dimensional lookup table such that the screen of an edge screen processing unit 307 to be described later obtains a desired density characteristic, like the gamma correction unit 303. Modifying the one-dimensional lookup table of the edge gamma correction unit 306 enables control to, for example, change the strength of the jaggy reduction effect. The edge screen processing unit 307 performs screen processing to convert the image data into 1-bit image data, like the screen processing unit 304, and outputs the converted image data to the OR operation unit 308.

The OR operation unit 308 performs a logical OR operation on the bit basis for each pixel of the two image data received from the screen processing unit 304 and the edge screen processing unit 307, and outputs the result to the selector 309. That is, when at least one of corresponding pixels of the two image data received from the screen processing unit 304 and the edge screen processing unit 307 has the value "1", the OR operation unit 308 outputs "1" as image data. If both pixels have the value "0", the OR operation unit 308 outputs "0" as image data.

The edge determination unit 305 (edge detection unit) determines an edge portion based on the image data output from the color conversion unit 302, and sends a signal representing an edge/non-edge portion to the selector 309 in correspondence with each pixel of the image data. For each pixel of the image data, a 3×3 pixel region including neighbor pixels is acquired, and the maximum and minimum values in that region are obtained. If the absolute value of the difference is larger than a predetermined value, the pixel is determined as an edge portion. Otherwise, the pixel is determined not to be an edge portion. The above-described signal is thus generated. Note that although the edge determination unit 305 determines an edge portion based on the absolute value of the difference between the maximum value and the minimum value in the 3×3 pixel region, the present invention is not limited to this. Whether a pixel is an edge portion may be determined by, for example, obtaining the primary differential between each pixel of the image data and the neighbor pixels. Alternatively, the edge determination unit 305 may be configured to determine an edge portion using information obtained by causing the image generation unit 301 to analyze the print data (PDL data).

Based on the signal representing an edge/non-edge portion output from the edge determination unit 305, the selector 309 selects one of the two input image data, and outputs it to the printer unit 102. More specifically, when a pixel of the image data is an edge portion, the selector 309 selectively outputs the image data output from the OR operation unit 308. When the pixel is not an edge portion, the selector 309 selectively outputs the image data output from the screen processing unit 304.

Note that a CPU 310 controls the operation of the entire image processing unit 300 by controlling each functional unit based on a control program held in a ROM 311. A RAM 312 is used as the work area of the CPU 310. The RAM 312 also stores the one-dimensional lookup tables used by the gamma correction unit 303 and the edge gamma correction unit 306, and threshold matrices (to be described later) used by the screen processing unit 304 and the edge screen processing unit 307.

Note that in the above description, the gamma correction unit 303 and the screen processing unit 304, and the edge gamma correction unit 306 and the edge screen processing unit 307 operate in parallel, and the OR operation unit 308 always operates. However, for example, if each pixel of image data is not an edge portion based on the determination result of the edge determination unit 305, only the gamma correction unit 303 and the screen processing unit 304 may selectively be operated to output the image data to the printer unit 102. At this time, only when each pixel of image data is an edge portion, the edge gamma correction unit 306, the edge screen processing unit 307, and the OR operation unit 308 are also operated to output the processing result of the OR operation unit 308 to the printer unit 102.

Although the printer unit 102 can print 1-bit image data in the above description, the present invention is not limited to this. The present invention is also usable to a printer unit capable of printing multilevel image data such as 4-bit image data, as a matter of course. In this case, the screen processing unit 304, the edge screen processing unit 307, and the OR operation unit 308 of the image processing unit 300 process the image data in the number of bits corresponding to the printer unit 102.

<Operation of Screen Processing>

Figure 4:
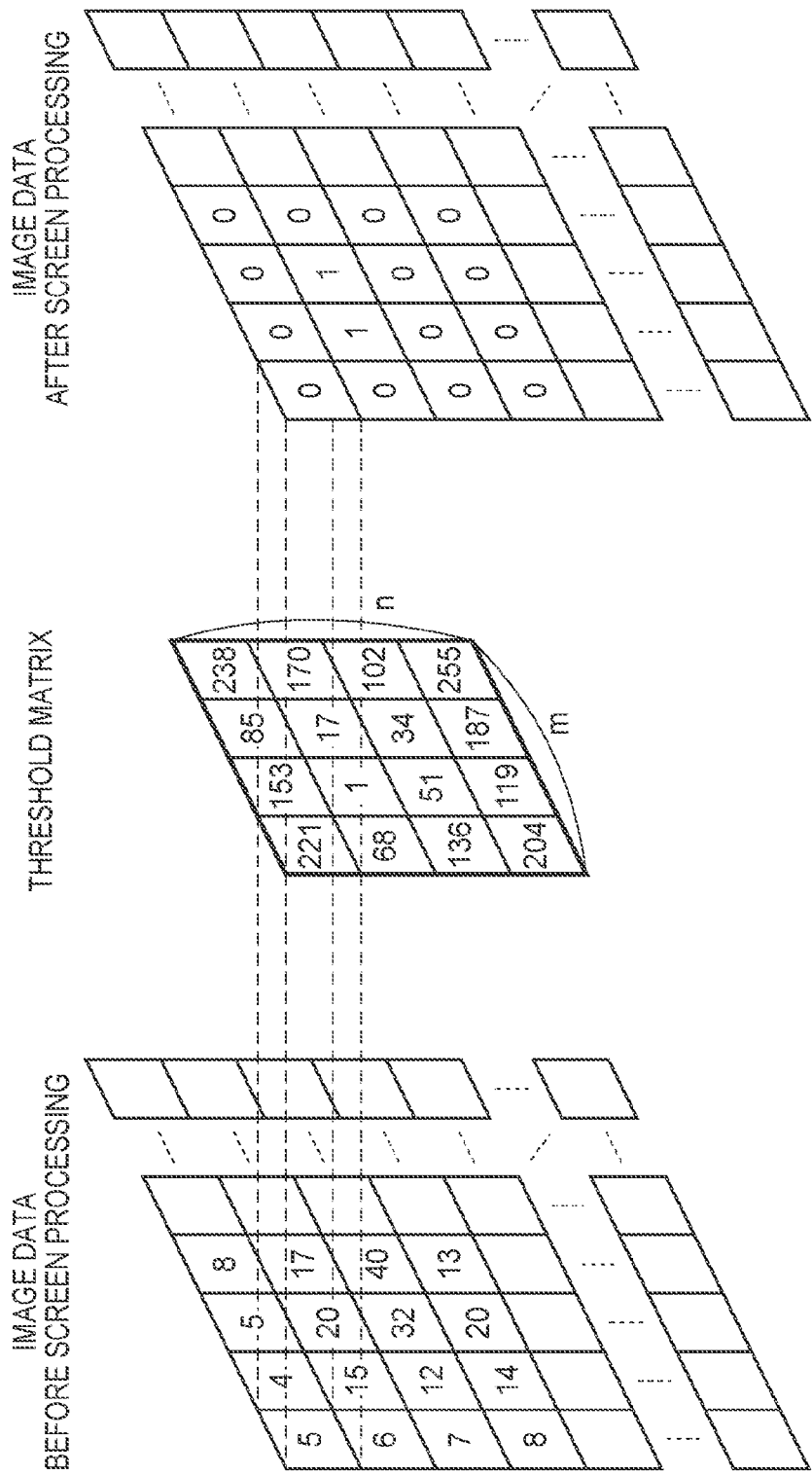
FIG. 4 is a view for explaining binary screen processing.

The threshold matrix of screen processing of generating a binary (1-bit) image will be described first. FIG. 4 is a view schematically showing binary screen processing to be performed by the screen processing unit 304 (first screen processing unit) and the edge screen processing unit 307 (second screen processing unit). The binary screen processing converts input image data into 1-bit (that is, binary) image data printable by the printer unit 102 using a threshold matrix.

The threshold matrix is formed by arranging M×N thresholds in a matrix having a width M and a height N. In the screen processing, a threshold corresponding to each pixel of image data is read out from the threshold matrix, and the pixel value is compared with the threshold. If the pixel value is equal to or larger than the threshold, "1" is output. Otherwise, "0" is output. The image data is thus converted into 1-bit data. The threshold matrix is repetitively applied in a tile pattern at a period of M pixels in the horizontal direction of the image data and at a period of N pixels in the vertical direction. Note that the screen processing is not limited to this, and an arbitrary known method of binarizing image data at a predetermined period is applicable.

Figure 5:
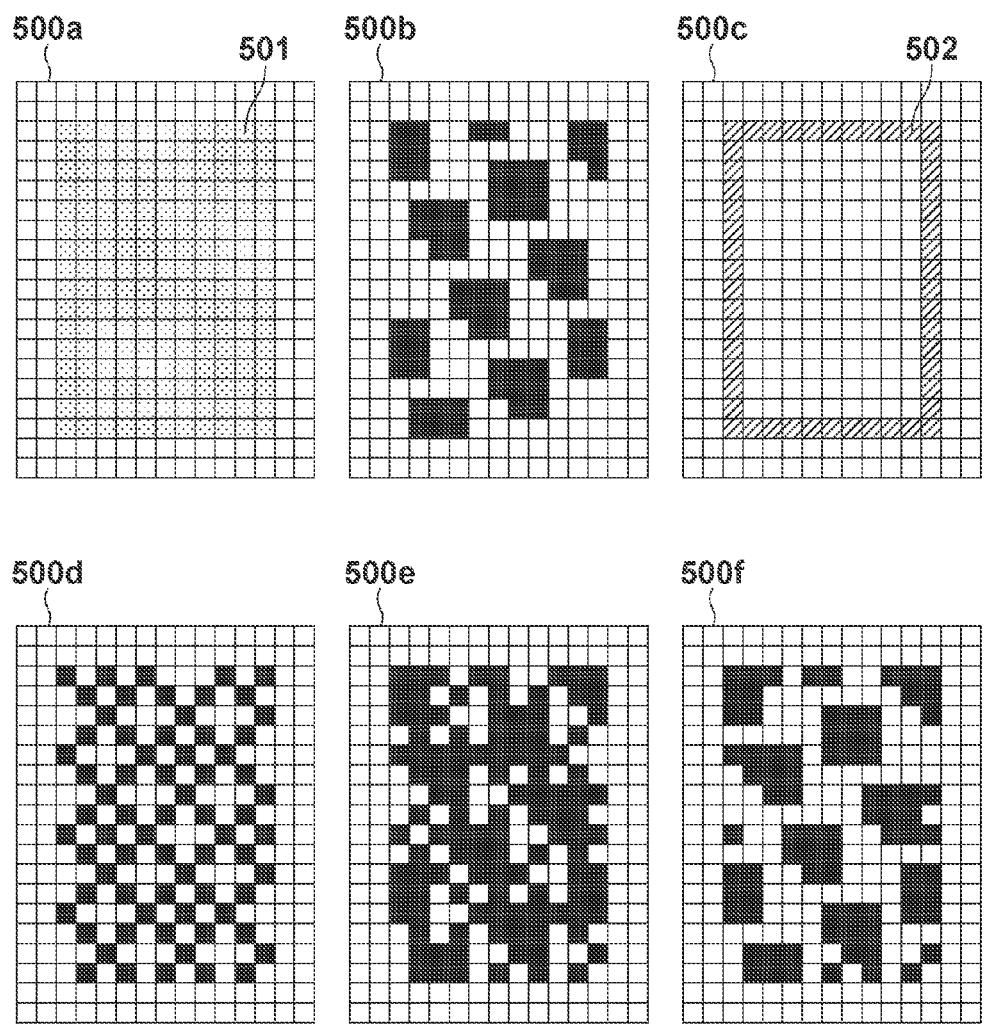
FIG. 5 is a view showing an example of a processing result according to the first embodiment (image object having a density of 40%)
Figure 6:
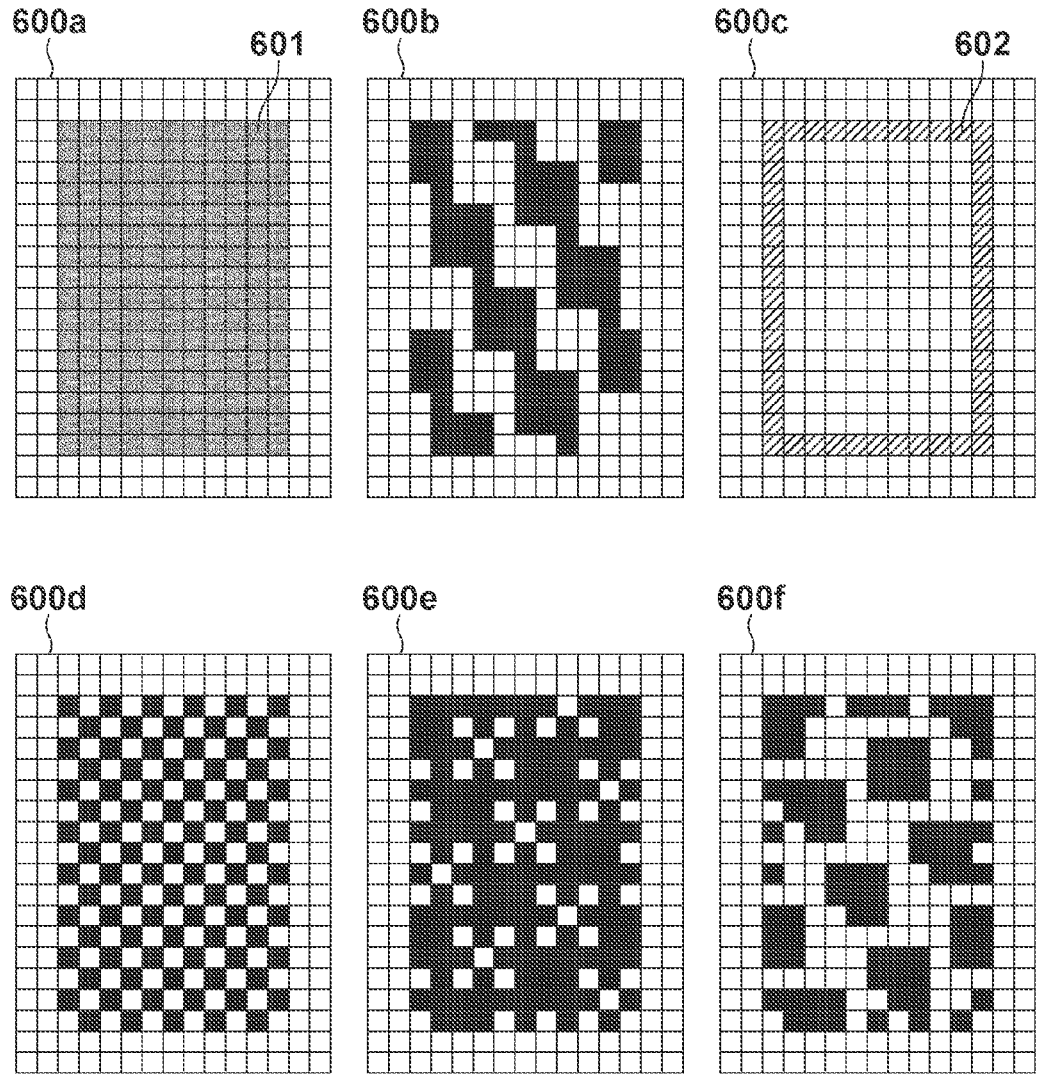
FIG. 6 is a view showing an example of a processing result according to the first embodiment (image object having a density of 50%)

FIGS. 5 and 6 are views showing examples of an image change caused by applying screen processing. Note that image data 500a including an intermediate color object 501 having a cyan density of 40% and image data 600a including an object 601 having a cyan density of 50% are illustrated as examples of CMYK color space image data which is the screen processing target after color conversion processing.

Image data 500b and 600b are examples of results obtained by applying gamma correction processing and screen processing to the objects 501 and 601. Examples are illustrated in which the screen processing is applied using a threshold matrix (first threshold matrix) having a screen ruling (resolving power) of 134.16 lines/inch and a screen angle of 63.43°. These image data are converted into 1-bit halftone dots by the screen processing. Hence, a step called a jaggy may be generated in the edge portion of the object 501 or 601. As a result, it may be impossible to accurately reproduce the object shape.

Image data 500c and 600c are examples of results obtained by causing the edge determination unit 305 to detect edge portions from the image data 500a and 600a. In this case, the edge determination unit 305 determines that a pixel is an edge portion when the absolute value of the difference between the maximum value and the minimum value in the 3×3 pixel region is larger than a value corresponding to a density of 25%. As a result, the edge determination unit 305 determines the outer peripheral portions around the objects 501 and 601, which have a width corresponding to one pixel, as edge portions 502 and 602.

Image data 500d and 600d are examples of results obtained by applying edge gamma correction processing and edge screen processing to the image data 500a and 600a. Examples are illustrated in which the screen processing is applied using a threshold matrix (second threshold matrix) having a screen ruling of 424.26 lines/inch and a screen angle of 45°. That is, the threshold matrix used by the edge screen processing unit 307 requires a high resolving power to reduce the jaggy in the edge portion, and is therefore configured to have a screen ruling higher than that of the threshold matrix used by the screen processing unit 304.

Image data 500e is an example of a result obtained by causing the OR operation unit 308 to calculate the logical OR between the image data 500b and 500d on the pixel basis. Similarly, image data 600e is an example of a result obtained by causing the OR operation unit 308 to calculate the logical OR between the image data 600b and 600d on the pixel basis.

Image data 500f is an example of a result obtained by causing the selector 309 to select one of the image data 500b and 500e on the pixel basis based on the edge portion 502 determined by the edge determination unit 305. More specifically, the selector 309 selectively outputs the image data 500e for a pixel corresponding to the edge portion 502, and the image data 500b otherwise. Similarly, image data 600f is an example of a result obtained by causing the selector 309 to select one of the image data 600b and 600e on the pixel basis based on the edge portion 602 determined by the edge determination unit 305. More specifically, the selector 309 selectively outputs the image data 600e for a pixel corresponding to the edge portion 602, and the image data 600b otherwise (for a pixel that doe not correspond to the edge portion).

<Explanation of Effects>

When the screen processing according to the first embodiment is applied to the image data 500a and 600a, as described above, the image data 500f and 600f are obtained. On the other hand, FIG. 7 shows examples of outline emphasis applied to the edge portion at a predetermined density to reduce the jaggy in a binary printer.

Image data 700a is obtained by performing outline emphasis for the edge portion of the object 501 at a predetermined density. Image data 700b is obtained by performing outline emphasis for the edge portion of the object 601 at a predetermined density. That is, regardless of the density difference between the objects 501 and 601, the 1-bit printer cannot perform outline emphasis for the edge portions using different tones, and each object has a solid outline with the maximum density. For this reason, a processing result unintended by the user is obtained at a high probability.

On the other hand, in the screen processing according to the first embodiment, the jaggy is reduced as compared to the image data 500b and 600b, as indicated by the image data 500f and 600f, although the arrangement is very simple. Additionally, the density of the edge portion can be changed stepwise in accordance with the density of the object 501 or 601. Hence, a solid outline as indicated by the image data 700a and 700b does not exist.

As described above, according to the image forming apparatus of the first embodiment, it is possible to reduce the jaggy in the edge portion of an intermediate color object generated upon screen processing and improve the reproducibility of the object shape by the very simple arrangement. In addition, even a binary printer can suitably reduce the jaggy in the edge portion of an object included in image data in accordance with the density of the object.

(Second Embodiment)

In the second embodiment, processing of generating a 16-tone (4-bit) image by screen processing will be described. Note that the second embodiment is different from the first embodiment only in part of an image processing unit 300. Hence, only portions different from the first embodiment will be explained below.

Figure 8:
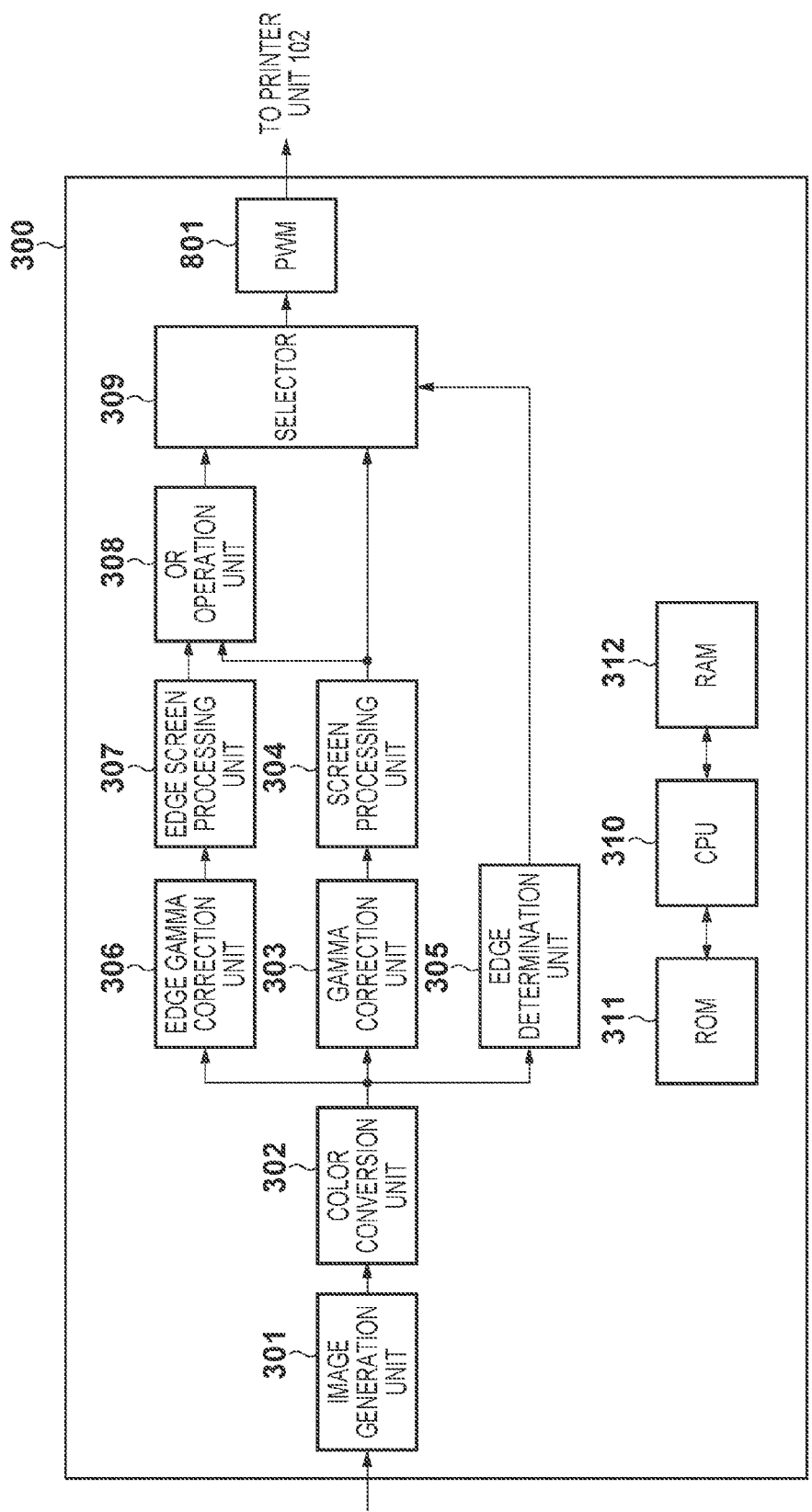
FIG. 8 is a functional block diagram showing an image processing unit according to the second embodiment.

FIG. 8 is a functional block diagram showing an image processing unit according to the second embodiment. A printer unit 102 outputs 4-bit image data. For this purpose, a screen processing unit 304 and an edge screen processing unit 307 perform multilevel screen processing to be described later to convert image data output from a gamma correction unit 303 and an edge gamma correction unit 306 into 4-bit image data.

An OR operation unit 308 calculates the logical OR on the bit basis for each pixel of the two 4-bit image data output from the screen processing unit 304 and the edge screen processing unit 307, and outputs the result to a selector 309. The selector 309 selectively outputs the image data to a PWM 801 based on the signal output from an edge determination unit 305 to represent whether a pixel is an edge portion. The PWM 801 converts the received 4-bit image data into the exposure time of the printer unit 102 and outputs it to the printer unit 102.

<Operation of Screen Processing>

Figure 9:
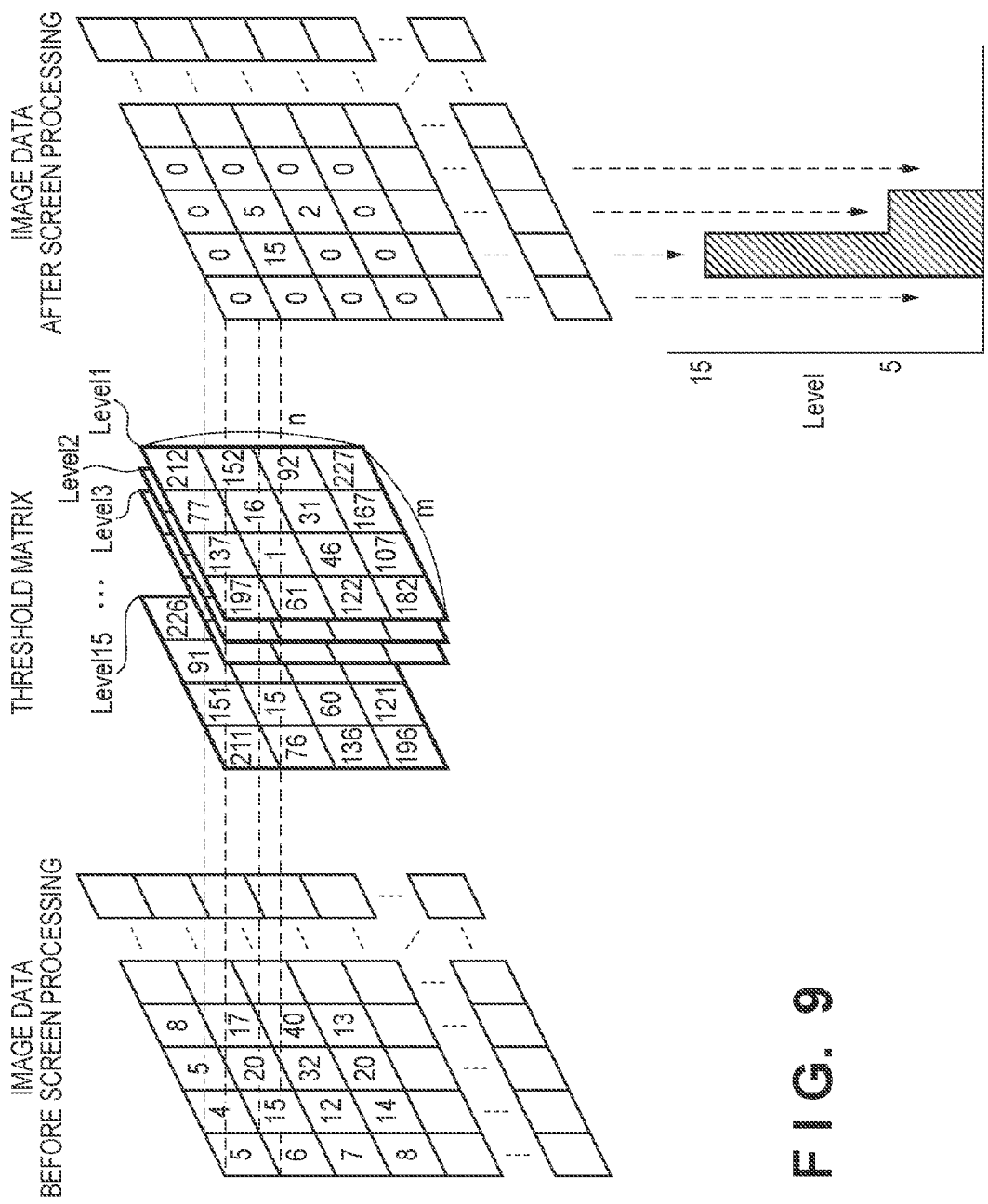
FIG. 9 is a view for explaining multilevel screen processing (non-edge portion)
Figure 10:
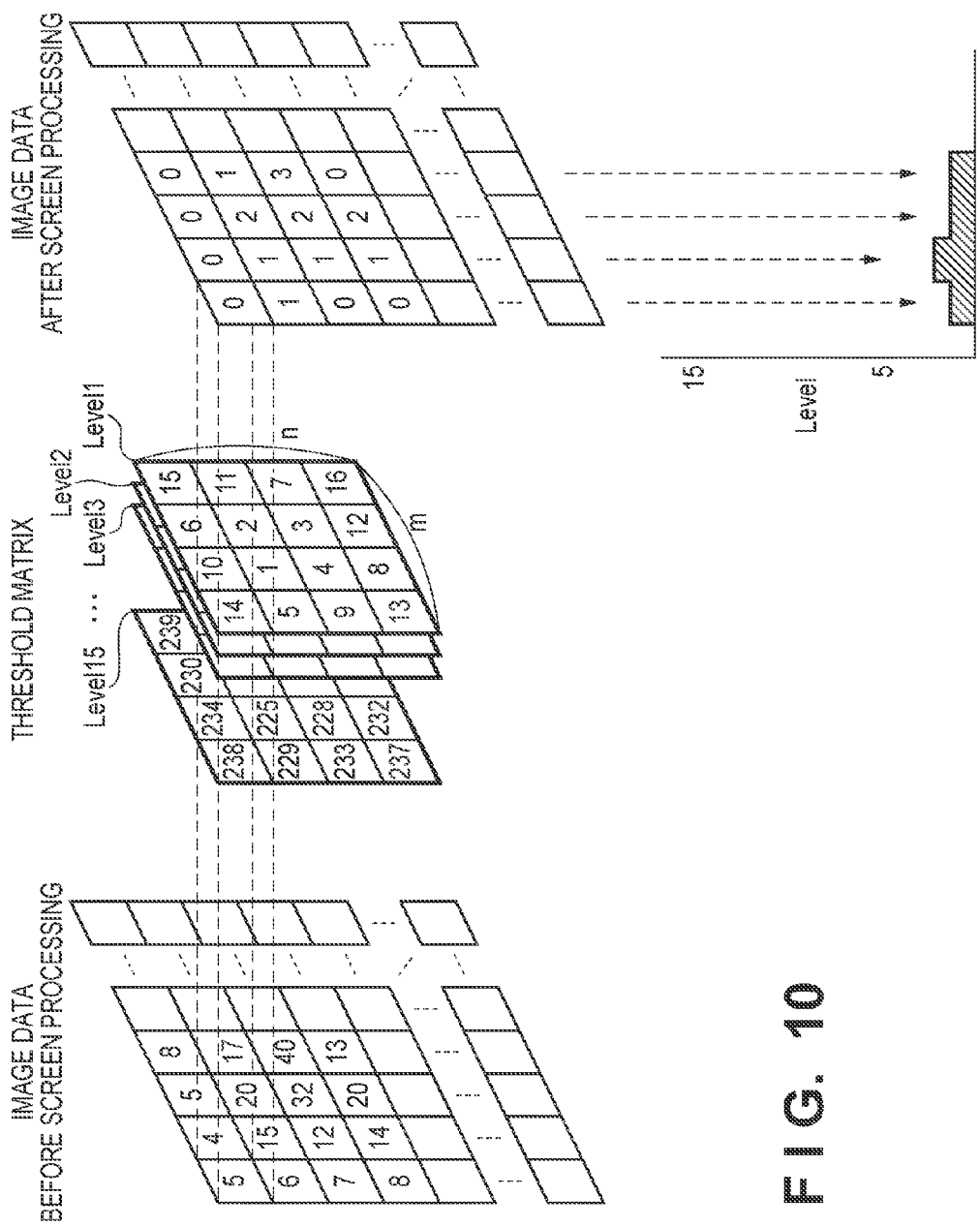
FIG. 10 is a view for explaining multilevel screen processing (edge portion)

The threshold matrix of screen processing of generating a 16-tone (4-bit) image will be described first. FIGS. 9 and 10 are view schematically showing screen processing to be performed by the screen processing unit 304 and the edge screen processing unit 307, respectively. That is, the processing converts an image into a 4-bit (that is, 16-tone) image printable by the printer unit 102 using a threshold matrix group including 15 (=$2^4$−1) threshold matrices.

Each threshold matrix is formed by arranging M×N thresholds in a matrix having a width M and a height N. The number of threshold matrices included in the threshold matrix group is determined based on the number of tones of image data to be output ($2^L$ tones for L bits (L is an integer of 2 or more)). The number of matrices is ($2^L$−1). In the screen processing, a threshold corresponding to each pixel of image data is read out from each plane of the threshold matrices, and the pixel value is compared with thresholds as many as the planes.

In the case of 16 tones, Level 1 to Level 15 are set for the threshold matrices. If the pixel value is equal to or larger than a threshold, the maximum value at the level of the matrix where the threshold has been read out is output. Otherwise, "0" is output. The pixel value of each pixel of the image data is thus converted into a 4-bit value. The threshold matrices are repetitively applied in a tile pattern at a period of M pixels in the horizontal direction of the image data and at a period of N pixels in the vertical direction.

The screen processing unit 304 uses a threshold matrix in which the halftone dot period strongly appears, as shown in FIG. 9. That is, the thresholds are given so as to prefer halftone dot-growth caused by increasing the tone value over that caused by increasing the area. As can be seen, after a given pixel has grown to the maximum level, adjacent pixels similarly grow in the level direction to make the halftone dots concentrate. As a characteristic feature, although the threshold matrix group set in this way exhibits a strong halftone dot pattern and therefore has a low resolving power, the tone characteristic is stable because of dot concentration. The threshold matrix group having this characteristic feature will be referred to as a dot-concentrated threshold matrix hereinafter.

On the other hand, the edge screen processing unit 307 uses a threshold matrix in which the period of the periodical halftone dots hardly appears, as shown in FIG. 10. That is, unlike the dot-concentrated threshold matrix, the thresholds are given so as to prefer halftone dot-growth caused by increasing the area over that caused by increasing the tone value. As can be seen, before a given pixel grows to the maximum level, pixels in the halftone dot grow so as to increase the area of the halftone dot. As a characteristic feature, the tone characteristic is unstable, although the threshold matrix can more accurately reproduce an object shape because the periodicity hardly appears, and the resolving power is high. This threshold matrix will be referred to as a flat threshold matrix hereinafter.

Note that in the above description, for example, the threshold matrix used by the edge screen processing unit 307 has the same screen ruling and screen angle as those of the threshold matrix used by the screen processing unit 304. However, the present invention is not limited to this. For example, a threshold matrix having a higher screen ruling or a different screen angle may be used as long as it is a flat threshold matrix, as a matter of course. In addition, the screen processing is not limited to this, and an arbitrary known method of converting input image data having a predetermined period into image data having fewer tones is applicable.

<Operation of Screen Processing>

Figure 11:
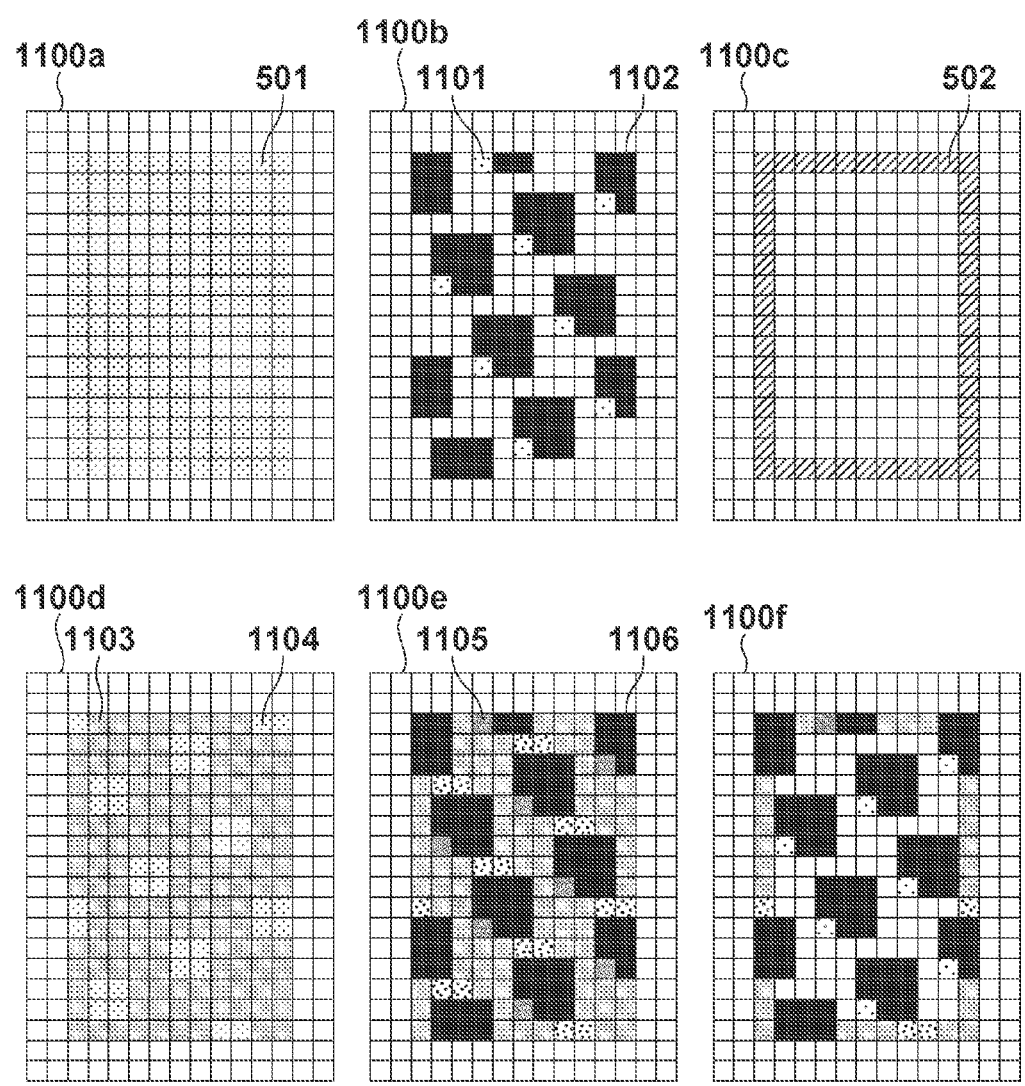
FIG. 11 is a view showing an example of the processing result of an image object according to the second embodiment.

FIG. 11 is a view showing an example of an image change caused by applying screen processing. Note that image data 1100a including an intermediate color object 501 having a cyan density of 40% is illustrated as an example of CMYK color space image data which is the screen processing target after color conversion processing.

Image data 1100b is an example of 4-bit image data obtained by applying gamma correction processing and screen processing to the object 501. An example is illustrated in which the screen processing is applied using a threshold matrix having a screen ruling of 134.16 lines/inch and a screen angle of 63.43°. A pixel 1101 is converted into the 4-bit value "1" by the screen processing. A pixel 1102 is converted into the maximum 4-bit value "15". The image data is converted into 4-bit halftone dots by the screen processing. Hence, a step called a jaggy may be generated in the edge portion of the object 501. As a result, it may be impossible to accurately reproduce the object shape.

Image data 1100c is an example of a result obtained by causing the edge determination unit 305 to detect an edge portion from the image data 1100a. In this case, the edge determination unit 305 determines that a pixel is an edge portion when the absolute value of the difference between the maximum value and the minimum value in the 3×3 pixel region is larger than a value corresponding to a density of 25%. As a result, the edge determination unit 305 determines the outer peripheral portion around the object 501, which has a width corresponding to one pixel, as an edge portion 502.

Image data 1100d is an example of a result obtained by applying edge gamma correction processing and edge screen processing to the object 501. The pixel value is represented by 4 bits (0 to 15). A pixel 1103 is converted into the 4-bit value "6". A pixel 1104 is converted into the 4-bit value "5". The edge screen processing unit 307 is the same as the screen processing unit 304 in terms of the screen ruling and the screen angle. However, as described above, the edge screen processing unit 307 uses a flat threshold matrix different from the threshold matrix (dot-concentrated threshold matrix) used by the screen processing unit 304. The thresholds of the threshold matrix used by the edge screen processing unit 307 are given so as to prefer halftone dot-growth caused by increasing the area over that caused by increasing the tone value because a high resolving power is necessary for reducing the jaggy in the edge portion.

Image data 1100e is an example of a result obtained by causing the OR operation unit 308 to calculate the logical OR between the image data 1100b and 1100d on the pixel and tone bit basis. A pixel 1105 is converted into the 4-bit value "7" by calculating the logical OR between the pixels 1101 and 1103 on the bit basis. A pixel 1106 is converted into the 4-bit value "15" by calculating the logical OR between the pixels 1102 and 1104 on the bit basis.

Image data 1100f is an example of a result obtained by causing the selector 309 to select one of the image data 1100b and 1100e on the pixel basis based on the edge portion 502 determined by the edge determination unit 305. More specifically, the selector 309 selectively outputs the image data 1100e for a pixel corresponding to the edge portion 502, and the image data 1100b otherwise.

As a result, in the screen processing according to the second embodiment, the jaggy is reduced as compared to the image data 1100b, as indicated by the image data 1100f, although the arrangement is very simple.

As described above, according to the image forming apparatus of the second embodiment, it is possible to reduce the jaggy in the edge portion of an intermediate color object generated upon screen processing and improve the reproducibility of the object shape by the very simple arrangement.

In addition, the flat threshold matrix that grows in the direction in which the halftone dot area increases is used in the edge screen processing. This allows to improve the reproducibility of the edge portion of the object, as compared to the first embodiment.

(Third Embodiment)

In the third embodiment, a case will be described in which the number of output bits of an image forming apparatus 100 can be switched between 1 bit and 4 bits for printing. Note that the third embodiment is different from the above-described first and second embodiments only in part of an image processing unit 300 in FIG. 8. Hence, the same reference numerals as in the above-described embodiments denote the same parts, and only different portions will be explained below.

In the third embodiment, a screen processing unit 304 and an edge screen processing unit 307 convert image data while switching the above-described screen processing between binary and multilevel in accordance with the print quality setting designated from an operation unit 103 or a PC 105. A RAM 312 stores threshold matrix sets to be used by the screen processing unit 304 and the edge screen processing unit 307 in correspondence with the binary and multilevel screen processing. The threshold matrices for one of the screen processing operations are set in the screen processing unit 304 and the edge screen processing unit 307.

An OR operation unit 308 calculates the logical OR on the bit basis for each pixel of image data in accordance with the number of bits of the image data output from the screen processing unit 304 and the edge screen processing unit 307, and outputs the result to a selector 309. A PWM 801 converts the received image data into the exposure time of a printer unit 102 and outputs it to the printer unit 102. Note that for 1-bit image data, the pixel value "1" is converted into the maximum exposure time.

Figure 12:
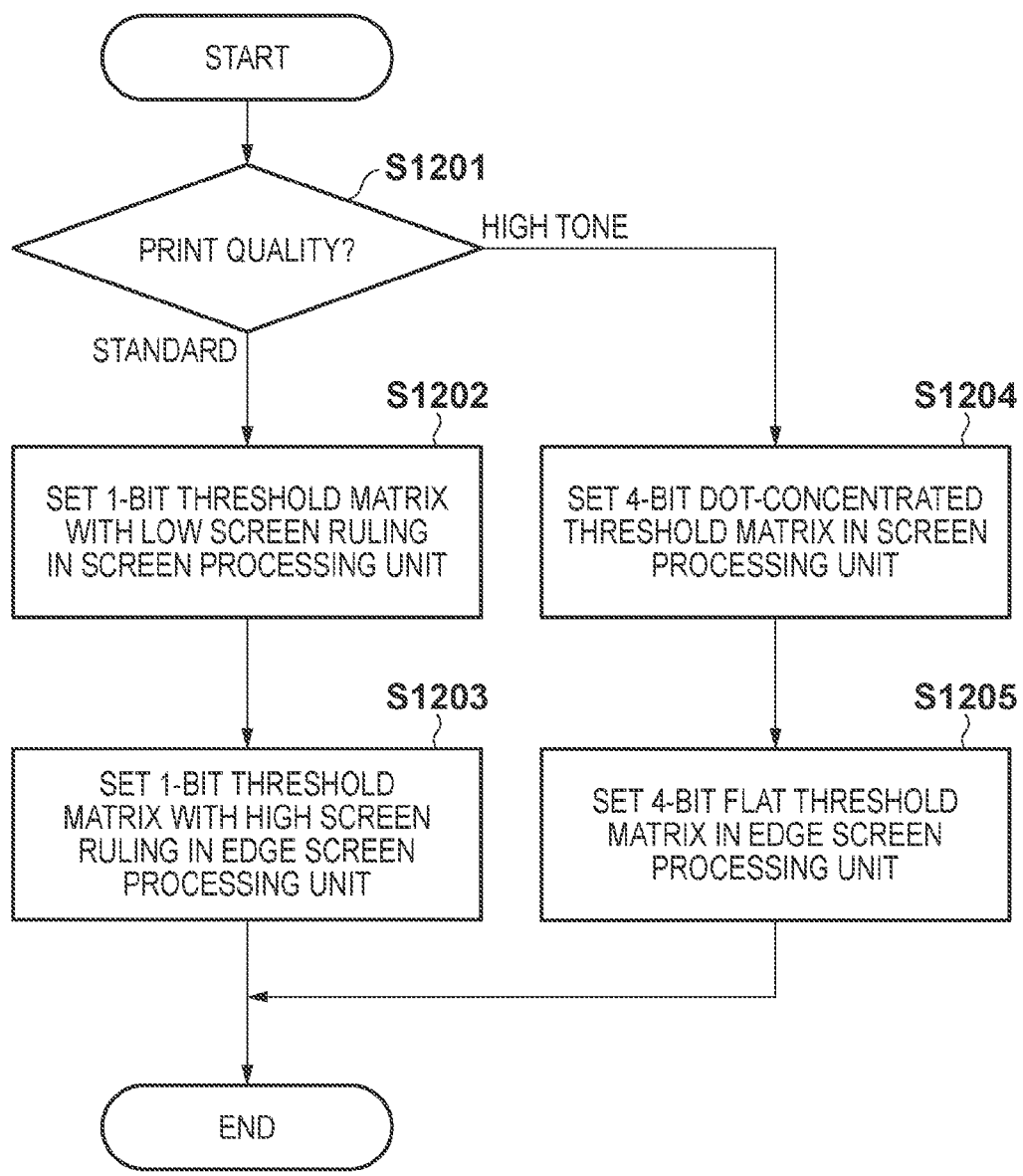
FIG. 12 is a flowchart illustrating an operation of changing a print quality setting.

FIG. 12 is a flowchart illustrating an operation of changing the print quality setting. A description will be made assuming that the screen processing unit 304 and the edge screen processing unit 307 of this embodiment operate in 1 bit for standard print quality and in 4 bits for high tone quality.

In step S1201, upon receiving a print quality change instruction from the operation unit 103 or the PC 105, a CPU 310 determines whether the print quality is standard or high tone quality. If the print quality is standard, the process advances to step S1202.

In step S1202, the CPU 310 reads out the threshold matrix for 1-bit processing from the RAM 312 and sets it in the screen processing unit 304. In step S1203, the CPU 310 reads out the threshold matrix for 1-bit processing from the RAM 312 and sets it in the edge screen processing unit 307. The threshold matrix set at this time has a screen ruling higher than that of the threshold matrix set in the screen processing unit 304, as described above.

On the other hand, if the print quality is high tone quality in step S1201, the process advances to step S1204. The CPU 310 reads out the dot-concentrated threshold matrix for 4-bit processing from the RAM 312 and sets it in the screen processing unit 304. In step S1205, the CPU 310 reads out the flat threshold matrix for 4-bit processing from the RAM 312 and sets it in the edge screen processing unit 307.

With the above-described arrangement, switching between 1-bit screen processing and 4-bit screen processing is done in accordance with the tone quality desired by the user. If the user wants a high-tone (high-quality) output image, 4-bit processing is executed. On the other hand, even if the user selects a lower tone (standard quality), it is possible to reduce the jaggy generated in the edge portion of an intermediate color object and improve the reproducibility of an object.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-276390, filed Dec. 10, 2010, which is hereby incorporated by reference herein in its entirety.

What is claimed is:

1. An image processing apparatus comprising:
a first screen processing unit which applies screen processing to image data using a first threshold matrix having a first screen ruling;
a second screen processing unit which applies screen processing to the image data using a second threshold matrix having a second screen ruling higher than the first screen ruling;
an edge detection unit which detects an edge portion of an object included in the image data; and
an output unit which outputs image data obtained by a logical OR operation between image data obtained by said first screen processing unit and image data obtained by said second screen processing unit for a pixel detected by said edge detection unit as an edge portion, and outputs the image data obtained by said first screen processing unit for a pixel other than the edge portion.

2. The apparatus according to claim 1, wherein a resolving power of the image data obtained by said second screen processing unit is higher than the resolving power of the image data obtained by said first screen processing unit.

3. The apparatus according to claim 1, wherein each of the first threshold matrix and the second threshold matrix includes a dot-concentrated threshold matrix.

4. The apparatus according to claim 1, wherein the first threshold matrix includes a dot-concentrated threshold matrix, and the second threshold matrix includes a flat threshold matrix.

5. The apparatus according to claim 1, wherein the logical OR operation in said output unit is a logical OR operation on the bit basis for each pixel of the image data obtained by said first screen processing unit and the image data obtained by said second screen processing unit.

6. The apparatus according to claim 1, wherein each of the image data obtained by said first screen processing unit and the image data obtained by said second screen processing unit is binary image data.

7. The apparatus according to claim 1, wherein each of the image data obtained by said first screen processing unit and the image data obtained by the logical OR operation is L-bit (L is an integer of not less than 2) image data.

8. The apparatus according to claim 1, further comprising a setting unit which sets print quality of the image data output by said output unit,
wherein if the print quality set by said setting unit is 1-bit tone, a 1-bit threshold matrix is set as each of the first threshold matrix and the second threshold matrix, and if the print quality set by said setting unit is L-bit (L is an integer of not less than 2) tone, an L-bit threshold matrix is set as each of the first threshold matrix and the second threshold matrix.

9. A non-transitory storage medium which stores program that causes a computer to function as each unit of an image processing apparatus of claim 1.

10. The apparatus according to claim 8, wherein if the print quality set by said setting unit is L-bit (L is an integer of not less than 2) tone, the first threshold matrix is a dot-concentrated threshold matrix, and the second threshold matrix is a flat threshold matrix.

11. An image processing method comprising:
a first screen processing step of applying screen processing to image data using a first threshold matrix having a first screen ruling;
a second screen processing step of applying screen processing to the image data using a second threshold matrix having a second screen ruling higher than the first screen ruling;
an edge detection step of detecting an edge portion of an object included in the image data; and
an output step of outputting image data obtained by a logical OR operation between image data obtained in the first screen processing step and image data obtained in the second screen processing step for a pixel detected in the edge detection step as an edge portion, and outputting the image data obtained in the first screen processing step for a pixel other than the edge portion.

* * * * *